Patented Dec. 28, 1943

2,337,598

UNITED STATES PATENT OFFICE 2,337,598

METHOD OF LOWERING THE GRAVITY AND INCREASING CASTING RATE OF CLAY SLIPS

Flemmon P. Hall, Syracuse, N. Y., assignor to Onondaga Pottery Company, Syracuse, N. Y., a corporation of New York No Drawing. Application October 29, 1941, Serial No. 417,010

9 Claims. (Cl. 106—72)

My present invention provides a method of lowering the specific gravity and increasing the casting rate of certain clay slips, and may be used in conjunction with the method of deflocculating clays described in a companion application Serial No. 417,009, filed October 29, 1941. In that application, I have described the use of a combination of barium carbonate and sodium hexametaphosphate $(NaPO_3)_6$ to assist and control the deflocculation of clay slips. The barium carbonate is ordinarily about ten times the amount of the sodium metaphosphate and the two together are not in excess of 0.5% of the solids in the slip. This combination renders certain domestic clays usable in ordinary ceramic casting processes with success substantially equal to that achieved where imported clays are used.

It has previously been thought that, to be commercially usable, a casting slip should have a specific gravity between 1.78 and 1.91 since when the gravity is less than 1.78 or possibly 1.75 the cast is apt to stick to the mould and to crack badly. For each body or blend of clays, feldspar, flint, etc., there is a specific gravity and viscosity which will produce the best results and the possible variation from these is small. Usually the higher the gravity and the lower the viscosity that can be obtained the greater is the probability of obtaining a usable casting slip. When difficult casting clays, such as hard Georgia kaolins, are used in amounts more than about 10%, the specific gravity is between 1.70 and 1.76 and the viscosity about 160 seconds. Such slips can not be used satisfactorily because the cast sticks to the mould and cracks on drying. Slips at present in use commercially have a casting rate of from 100 to 135 grams in ten minutes.

I have discovered that if small amounts of a metal stearate, such as aluminum, zinc or magnesium stearate, are added, the slip may be thinned with water and cast successfully and the casts will not stick to the mould or crack on drying even if the specific gravity is below the lowest point previously thought to be practical. Thus, it is possible to decrease the amount of deflocculant employed with the result that the casting rate is substantially increased.

I prefer to employ the novel deflocculant described in my companion application Serial No. 417,009, previously referred to. The sodium silicate N-brand referred to in the examples is a water glass having the composition $Na_2O$ 9.2, $SiO_3$ 29.3 and water 61.5.

A specific example of a slip embodying my invention is as follows:

| | Per cent |
|---|---|
| Victoria ball clay | 15.0 |
| Hard Georgia kaolin | 15.0 |
| No. Carolina kaolin | 15.0 |
| Tennessee ball clay #10 | 10.0 |
| Potter's flint | 36.0 |
| Oxford feldspar | 14 |

15,000 grams of the above and 5900 grams of water are added and the mixture is deflocculated with

| | Per cent |
|---|---|
| Sodium silicate "N" brand | 0.05 |
| Sodium tannate | 0.02 |
| Barium carbonate | 0.4 |
| Sodium hexametaphosphate $(NaPO_3)_6$ obtainable commercially under the name "Calgon" | 0.03 |

To the above is added 1.0% aluminum stearate.

The percentages of the deflocculants given above are based on the total weight of the clay solid in the batch.

This batch had a specific gravity of 1.68 and a viscosity of 180. The casting rate was 180 grams in ten minutes.

A similar batch with the necessary additional deflocculants with less water and without the aluminum stearate had a specific gravity of 1.83 and a viscosity of 180, but the casting rate was only 110 grams in ten minutes.

An example of another mixture is as follows:

| | Per cent |
|---|---|
| Hard Georgia kaolin | 15 |
| Florida kaolin | 6 |
| Kentucky ball clay, Old Mine #4 | 6 |
| North Carolina china clay | 17 |
| Oxford feldspar | 19 |
| Potter's flint | 35 |
| Whiting | 2 |

To a mixture of 15,000 grams of the above, add 5700 grams water. Then was added:

| | Per cent |
|---|---|
| Sodium silicate "N" brand | .04 |
| Sodium tannate | .02 |
| Barium carbonate | .4 |
| Calgon | .03 |
| Aluminum stearate | 1.00 |

The most satisfactory amount of the stearate appears to be about one per cent, but fairly good results may be obtained with amounts up to two per cent.

My invention, because of the great increase in the casting rate produced by the method described herein, results in important economies in operation and makes it possible to avoid the use of imported clays at least to as large an extent as formerly. While my invention originated in connection with my work on the hard Georgia kaolin and in this application I have described it with reference to slips containing such clays it is obvious that it may be used advantageously with slips containing other clays.

I claim:

1. The method of lowering the specific gravity and increasing the casting rate of clay slips which consists in adding metal stearate to the slip.

2. The method of lowering the specific gravity and increasing the casting rate of clay slips which consists in adding metal stearate to the slip in an amount not in excess of 2 per cent.

3. The method of lowering the specific gravity and increasing the casting rate of clay slips which consists in adding metal stearate to the slip metal stearate in the amount of about 1 per cent.

4. The method of lowering the specific gravity and increasing the casting rate of clay slips which consists in adding aluminum stearate to the slip.

5. The novel clay slip which includes casting clays, a deflocculant, and a metal stearate.

6. The novel clay slip which includes casting clays, a deflocculant, and a metal stearate in an amount not in excess of 2 per cent.

7. The novel clay slip which includes casting clays, a deflocculant, and a metal stearate in the amount of about 1 per cent.

8. The novel clay slip which includes casting clays, a deflocculant, and an aluminum stearate in an amount not in excess of 2 per cent.

9. The novel clay slip which includes casting clays, a deflocculant, barium carbonate, hexasodiummetaphosphate and a metal stearate.

FLEMMON P. HALL.